US009043559B2

(12) United States Patent
Radovic et al.

(10) Patent No.: US 9,043,559 B2
(45) Date of Patent: May 26, 2015

(54) BLOCK MEMORY ENGINE WITH MEMORY CORRUPTION DETECTION

(71) Applicant: Oracle International Corporation, Redwood City, CA (US)

(72) Inventors: Zoran Radovic, Los Gatos, CA (US); Darryl J. Gove, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 204 days.

(21) Appl. No.: 13/658,789

(22) Filed: Oct. 23, 2012

(65) Prior Publication Data

US 2014/0115283 A1 Apr. 24, 2014

(51) Int. Cl.
*G06F 12/00* (2006.01)
*G06F 12/16* (2006.01)

(52) U.S. Cl.
CPC ..................... *G06F 12/16* (2013.01)

(58) Field of Classification Search
CPC ................................ G06F 2212/403
USPC ........................ 711/118, 141, 210
See application file for complete search history.

(56) References Cited

U.S. PATENT DOCUMENTS

| | | |
|---|---|---|
| 3,868,632 A | 2/1975 | Hong et al. |
| 4,608,687 A | 8/1986 | Dutton |
| 4,646,312 A | 2/1987 | Goldsbury et al. |
| 4,761,785 A | 8/1988 | Clark et al. |
| 5,014,273 A | 5/1991 | Gagliardo et al. |
| 5,081,626 A | 1/1992 | Scott |
| 5,276,834 A | 1/1994 | Mauritz et al. |
| 5,305,326 A | 4/1994 | Solomon et al. |
| 5,577,243 A | 11/1996 | Sherwood et al. |
| 5,627,965 A | 5/1997 | Liddell et al. |
| 5,745,508 A | 4/1998 | Prohofsky |
| 5,754,567 A | 5/1998 | Norman |
| 5,856,987 A | 1/1999 | Holman |
| 5,872,798 A | 2/1999 | Baggen et al. |
| 5,889,940 A | 3/1999 | Liddell et al. |
| 6,035,432 A | 3/2000 | Jeddeloh |
| 6,038,684 A | 3/2000 | Liddell et al. |

(Continued)

OTHER PUBLICATIONS

Zoran Radovic, et al., "Efficient Storage of Memory Version Data," U.S. Appl. No. 13/178,240, filed Jul. 7, 2011, 39 pages.

(Continued)

*Primary Examiner* — Gurtej Bansal
(74) *Attorney, Agent, or Firm* — Meyertons, Hood, Kivlin, Kowert & Goetzel, P.C.

(57) ABSTRACT

Techniques for handling version information using a copy engine. In one embodiment, an apparatus comprises a copy engine configured to perform one or more operations associated with a block memory operation in response to a command. Examples of block memory operations may include copy, clear, move, and/or compress operations. In one embodiment, the copy engine is configured to handle version information associated with the block memory operation based on the command. The one or more operations may include operating on data in a cache and/or modifying entries in a memory. In one embodiment, the copy engine is configured to compare version information in the command with stored version information. The copy engine may overwrite or preserve version information based on the command. The copy engine may be a coprocessing element. The copy engine may be configured to maintain coherency with other copy engines and/or processing elements.

19 Claims, 8 Drawing Sheets

(56) References Cited

U.S. PATENT DOCUMENTS

| | | | |
|---|---|---|---|
| 6,047,392 | A | 4/2000 | Liddell et al. |
| 6,049,893 | A | 4/2000 | Liddell et al. |
| 6,092,218 | A | 7/2000 | Liddell et al. |
| 6,134,672 | A | 10/2000 | Liddell et al. |
| 6,134,679 | A | 10/2000 | Liddell et al. |
| 6,141,766 | A | 10/2000 | Liddell et al. |
| 6,170,068 | B1 | 1/2001 | Liddell et al. |
| 6,173,416 | B1 | 1/2001 | Liddell et al. |
| 6,480,982 | B1 | 11/2002 | Chan et al. |
| 6,519,704 | B1 | 2/2003 | Liddell et al. |
| 6,539,513 | B1 | 3/2003 | Chen |
| 6,574,768 | B2 | 6/2003 | Cypher |
| 6,804,799 | B2 | 10/2004 | Zuraski, Jr. |
| 6,912,686 | B1 | 6/2005 | Rodriguez et al. |
| 6,973,613 | B2 | 12/2005 | Cypher |
| 7,020,811 | B2 | 3/2006 | Byrd |
| 7,036,066 | B2 | 4/2006 | Weibel et al. |
| 7,099,659 | B1 * | 8/2006 | Schnake et al. ............... 455/419 |
| 7,103,824 | B2 | 9/2006 | Halford |
| 7,188,296 | B1 | 3/2007 | Cypher |
| 7,257,666 | B2 | 8/2007 | Komatsu et al. |
| 7,530,008 | B2 | 5/2009 | Das et al. |
| 7,788,506 | B2 | 8/2010 | Bancel et al. |
| 7,992,061 | B2 | 8/2011 | Zeng |
| 2003/0074630 | A1 | 4/2003 | Batson et al. |
| 2004/0250028 | A1 * | 12/2004 | Daniels et al. ............... 711/156 |
| 2004/0255225 | A1 | 12/2004 | Takai |
| 2012/0137074 | A1 * | 5/2012 | Kim et al. ............... 711/122 |

OTHER PUBLICATIONS

Zoran Radovic, et al., "Instructions to Set and Read Memory Version Information," U.S. Appl. No. 13/196,514, filed Aug. 2, 2011, 41 pages.

Darryl J. Gove, et al., "Maximizing Encodings of Version Control Bits for Memory Corruption Detection," U.S. Appl. No. 13/198,904, filed Aug. 5, 2011, 60 pages.

* cited by examiner

Memory Corruption
Detection State

"0"

"1"

| MISMATCH | | Memory Stored Version Number | | |
|---|---|---|---|---|
| | | A | B | Reserved |
| Memory Access Address Version Number from Processor | A | 0 | 1 | 0 |
| | B | 1 | 0 | 0 |
| | Reserved | 1 | 1 | 0 |

*FIG. 6*

BLOCK MEMORY ENGINE WITH MEMORY CORRUPTION DETECTION

CROSS-REFERENCE TO RELATED APPLICATIONS

The following applications are related to the present disclosure:

U.S. application Ser. No. 13/178,240, entitled "Efficient Storage of Memory Version Data," and filed Jul. 7, 2011;

U.S. application Ser. No. 13/196,514, entitled "Instructions to Set and Read Memory Version Information," and filed Aug. 2, 2011; and U.S. application Ser. No. 13/198,904, entitled "Maximizing Encodings of Version Control Bits for Memory Corruption Detection," and filed Aug. 5, 2011.

Each of the above applications is incorporated by reference herein in their entireties. To the extent that any definitions or explanations in the above applications conflicts with definitions given in the present disclosure, the present disclosure controls.

BACKGROUND

1. Field of the Invention

This invention relates to computing systems, and more particularly to memory corruption detection.

2. Description of the Related Art

Memory corruption may occur when the contents of a memory location are unintentionally modified due to programming errors. One example of such corruption is an access of a byte of memory past the end of the array of bytes reserved for a particular data structure. In addition, memory corruption may occur when the contents of a memory location are intentionally modified by a malicious attack. When the corrupted memory contents are used later in the computer program, it may lead either to a program crash or to unexpected program behavior. Some programming languages (for example, C and C++) include features such as explicit memory management and pointer arithmetic. These features allow development of efficient applications and system software. However, when a computer programmer incorrectly uses these features, memory corruption may occur.

A computer programming language may be characterized as "type safe" when the language does not permit a computer programmer to use a value as a data type to which it does not belong. For example, a type safe programming language does not allow conversion of an integer variable to a pointer value. The C programming language is one example of a "type unsafe" language due to casting, particularly the casting of pointers to void pointers and back. The C++ programming language includes most of the C programming language as a subset. Therefore, the C++ programming language inherits the "type unsafe" property.

A computer programming language may be characterized as "memory safe" when the language allows programs to release a portion of memory when it is determined the portion of memory is unused for the remainder of the program evaluation. A programming language that is "memory unsafe" may cause security vulnerabilities with random-access memory (RAM) access, such as buffer overflows and dangling pointers. Programming languages, such as C and C++, that support arbitrary pointer arithmetic, casting, and deallocation are typically "memory unsafe". Some high-level programming languages are memory safe due to disallowing pointer arithmetic and casting, and enforcing tracing garbage collection. However, programming efficiency may be reduced.

Many malicious attacks reduce system security through memory corruption and may exploit memory unsafe and/or type unsafe characteristics of a programming language. For example, a type unsafe language may not prevent programming errors such as allowing user input to be used as a pointer value. A malicious attacker may exploit such programming errors to create memory corruption attacks and access various portions of programs or data. Other examples of programming errors include vulnerabilities regarding buffer overflow, heap corruption (such as heap buffer overflow and double free), integer overflow, and format strings.

SUMMARY

Techniques for supporting efficient memory corruption detection are contemplated.

In one embodiment, an apparatus includes a copy engine configured to perform one or more operations associated with a block memory operation in response to a command. In this embodiment, the copy engine is configured to handle version information associated with the block memory operation based on the command. Handling the version information may include preserving or overwriting version information. Handling the version information may also include comparing stored version information associated with a source and/or destination of one of the one or more operations to expected version information. Non-limiting examples of block memory operations include copy, erase, set, and compress operations.

The copy engine may perform operations on data in a cache and/or a memory. The copy engine may maintain coherency with other copy engines and/or processing elements. For example, the copy engine may invalidate or update entries in a cache when modifying data in a memory. As another example, the copy engine may mark entries in a cache as modified when it modifies data in a cache.

In one exemplary situation, a processing element sends a command to a copy engine based on a block memory clear operation. In one embodiment, the copy engine compares stored version information to version information included in the command to ensure that only locations associated with expected version information are cleared. If a mismatch between version information is detected, the copy engine may indicate the mismatch to the processing element that issued the command. In one embodiment, the copy engine either preserves or overwrites stored version information associated with the clear operation based on the command, e.g., such that the cleared memory region will be associated with either old version information if preserved or new information if overwritten.

These and other embodiments will become apparent upon reference to the following description and accompanying drawings.

BRIEF DESCRIPTION OF THE DRAWINGS

FIG. 6 is a generalized block diagram illustrating one embodiment of a truth table for a version number mismatch;

Figure 1A:
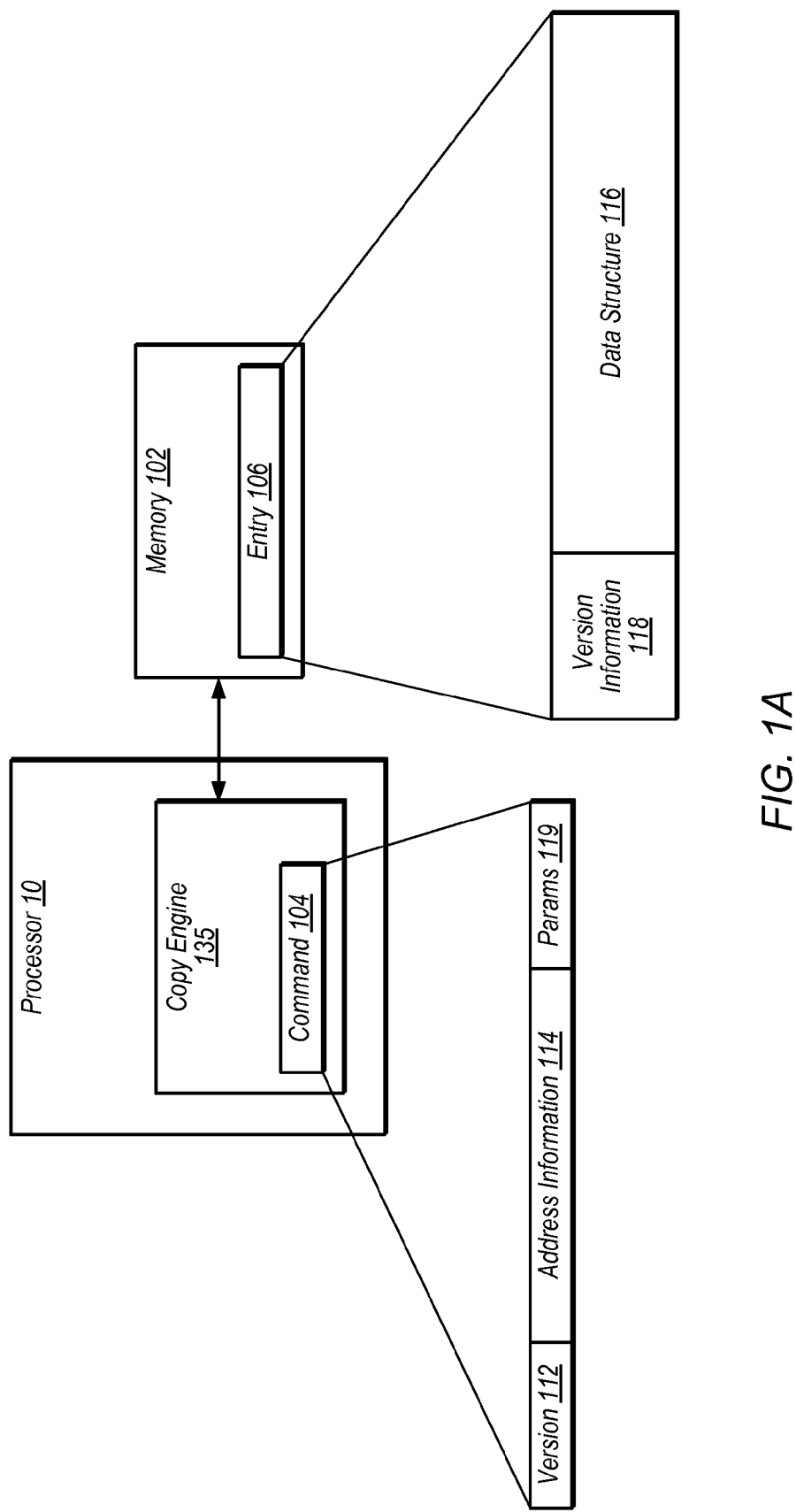
FIG. 1A is a block diagram illustrating one embodiment of a processor and a memory.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Further, as used herein, the term "configured to" connotes structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

As used herein, the term "computer-readable medium" refers to a non-transitory (tangible) medium that is readable by a computer or computer system, and includes magnetic, optical, and solid-state storage media such as hard drives, optical disks, DVDs, volatile or nonvolatile RAM devices, holographic storage, programmable memory, etc. This term specifically does not include transitory (intangible) media (e.g., a carrier wave).

DETAILED DESCRIPTION

Introduction to Copy Engine with Memory Corruption Detection

As discussed above, memory corruption detection may prevent program crashes, unexpected program behavior, and/or malicious attacked associated with memory corruption. Software solutions exist for memory corruption detection. Debugging tools such as Oracle Solaris Studio, Purify, Valgrind, and Insure++ perform this detection. However, these debuggers typically perform instrumentation of the computer program, which may cause program execution to run hundreds of times slower.

In some embodiments, memory corruption detection may be performed in hardware. For example, data structures in memory may include a stored version number. Each memory access may also include a version number. According to this methodology, if the version number of a given memory access does not match the stored version number of a corresponding data structure, memory corruption is detected.

Applications often request block memory operations, which may cause memory corruption. One example of a block memory operation is the C++ memcpy function, which copies the values of a specified number of bytes from a source location to a destination location. As used herein, the term "block memory operation" refers broadly to various memory operations that are performed on blocks of data. A "block" of data refers to a number of bytes of data, a data structure, and/or multiple data structures. The usefulness of a "block memory operation" is typically based on performing the same operation on a relatively large block of data. Thus, individual loads and stores from memory are not block memory operations. Examples of block memory operations include copying, erasing, setting, moving, writing a pattern, finding a pattern, compressing, decompressing, etc. Block memory operations may require considerable processing resources for large data blocks. Thus, in some embodiments, operations associated with block memory operations (including handling of version information, e.g., to detect memory corruption) may be performed by a separate hardware unit, often referred to as a copy engine.

Referring to FIG. 1A, one embodiment of a processor 10 and memory 102 is shown. In the illustrated embodiment, processor 10 includes copy engine 135 and provides a command 104 to copy engine 135. In the illustrated embodiment, command 104 includes version information 112, address information 114, and parameters 119. In the illustrated embodiment, memory 102 includes entry 106 which in turn includes version information 118 and data structure 116.

In one embodiment, processor 10 sends command 104 to copy engine 135 based on a block memory operation. In this embodiment, based on the command, copy engine 135 is configured to perform one or more operations associated with the block memory operation (e.g., load, store, copy, compress, decompress, and/or clear operations). Copy engine 135 may handle version information associated with the block memory operation. "Handling" version information refers to various manipulations of version information and/or determinations made based on version information. Thus, handling version information may or may not include modifying the version information. For example, in one embodiment, copy engine 135 compares version information 112 with version information 118. Copy engine 135 may indicate to processor 10 if there is a mismatch in version information. As another example, copy engine 135 may also preserve or overwrite version information associated with a block memory operation. For example, copy engine 135 may overwrite version information 118 with new version information based on command 104.

As used herein, the term "version information" refers to information identifying data. Version information may identify data at different points in time. For example, a first version number may be associated with data at a first point in time and a second version number may be associated with the data at a later point in time. Version information may also identify data at different locations. For example, a first version number may be associated with data stored in a first array, but a second version number may be associated with the same data when it is copied to a different array. Alternately, version information may remain associated with data when the data is copied to other locations. Version information may or may not be updated when associated data is modified. Version information may be implemented using any of various encodings. For example, a version number may be stored using a particular number of bits.

In the illustrated embodiment, command 104 includes parameters 119, which may indicate whether to check version information and/or whether to preserve or overwrite version information associated with a block memory operation. In some embodiments, processor 10 includes a cache (not shown), and parameters 119 also indicate whether to perform operations on data in the cache, data in memory 102, or data in both. Parameters 119 may also indicate where version information is located. Address information 114 may indicate source and/or destination addresses for a block memory operation.

In the illustrated embodiment, entry 106 includes version information 118 and data structure 116. Data structure 116 may be one of various data structures, including an array, list, set, string, queue, tree, graph, stack, etc. Version information 118 may be located at the same location or an adjacent location to entries of data structure 116. Alternatively, version information 118 may be located at a different location and associated with data structure 116. Version information 118 may be associated with various granularities of a data structure. For example, in one embodiment, version information is associated with each entry in a data structure. In another embodiment, version information is associated with data in a data structure on a cache line basis, e.g., each cache line is associated with version information. Thus, in some embodiments, multiple instances of version information may be associated with an entry in a data structure. Similarly, a command may be sent to copy engine 135 for various sizes of memory operations. In one embodiment, a command may be sent to copy engine 135 for each cache line of data to be operated on. In another embodiment, a single command may be sent to copy engine 135 based on a block memory operation spanning multiple cache lines.

In some embodiments, copy engine 135 may reside within processor 10 (as shown). In such embodiments, copy engine may reside in a memory controller unit or a processor core of the processor, or as a stand-alone unit, for example. In other embodiments, copy engine 135 may be included elsewhere, e.g., outside of processor 10 as a standalone unit. As used herein, the term "copy engine" refers to specialized circuitry configured to perform memory operations (e.g., a copy operation); accordingly, the term does not encompass a traditional load/store execution unit. Examples of memory operations include copy, set, move, clear, compress, decompress, etc. A processor may offload some memory operations to a copy engine, e.g., instead of performing the memory operations using the processor's load/store unit. For example, a block memory copy operation may require multiple loads and/or stores if performed by a traditional load/store unit. Thus, a processor may offload the block copy to a copy engine, e.g., in order to free processing resources for other tasks. A copy engine may be a coprocessor or may be implemented by a coprocessor.

The term "coprocessor" has a well-understood meaning in the art and refers to a specialized processing element configured to perform particular functionality for a main or primary processing element with which the coprocessor is associated. For example, a floating point coprocessor may be configured to perform floating-point operations for a main processor. A coprocessor may be configured to perform operations of a different width than a main processor. For example, in a situation in which a processor is configured to perform loads or stores of at most 128 bits, a coprocessor may be configured to perform memory operations on a cache line basis (e.g., operations of 256 bytes). As used herein, the term "coprocessing element" refers to a coprocessor, a portion thereof, and/or a collection of multiple coprocessors.

Further, as used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Still further, as used herein, the term "command" refers to information sent from one element or device to another element or device that indicates one or more operations to be performed. For example, a processing element may provide a command to a copy engine based on a block memory operation. In this example, the command may indicate to the copy engine to perform one or more operations associated with the block memory operation. In one embodiment, a command includes a pointer to a block of parameters and/or other information accessible to a copy engine. In another embodiment, a command includes one or more program instructions executable by a copy engine. In yet another embodiment, issuing a command includes storing information in one or more coprocessor registers. A command may be a coprocessor call, e.g., in embodiments in which copy engine 135 is a coprocessor. In various embodiments, any appropriate methodologies for providing similar information (i.e., a command) to a copy engine may be implemented. In various embodiments, a command includes version information associated with the command.

Copy engine 135 may be a processing element or a coprocessing element. Copy engine 135 may be implemented as a circuit such as an ASIC or a programmable logic device such as an FPGA. Copy engine 135 may execute instructions in order to perform the functionality described herein and may include a computer-readable storage medium for storing such instructions. Such instructions may or may not be similar to program instructions executed by processor 10.

Exemplary Array Allocation

Consider an exemplary situation in which data structure 116 is an array to be allocated. An array is a common data structure and is used herein for exemplary purposes, but in various embodiments, various data structures may be implemented and manipulated using the techniques described herein.

In order to allocate the array, a subroutine such as a calloc or malloc subroutine used in the C and C++ programming languages may be called. In this situation, processor 10 may determine version information for the array. The determination may be performed by an operating system (OS) executing on processor 10. Processor 10 may send the determined version information 112 in command 104 to copy engine 104 along with address information. In this exemplary situation, address information 114 may include an address to the array and a size of the array. Parameters 119 may indicate that 0's should be written to the array, for example.

In one embodiment, based on command 104, copy engine 135 writes zeros to the location(s) indicated by address information 114. In addition, copy engine 135 stores version information 112 in one or more locations associated with the array (e.g., as version information 118). In one embodiment, version information may be stored for each entry in the array. In another embodiment, version information may be stored for each block of data in the array that is the size of a cache line. Such version information may be carried along with an associated cache line throughout an entire memory system.

Exemplary Array Copy

Now consider an exemplary situation in which data structure 116 is an array (e.g., allocated as described above), and processor 10 send a command 104 to copy engine 135 based on a block copy operation (such as a memcpy subroutine used in the C and C++ programming languages) of the array from entry 106 to a new destination location. In one embodiment, copy engine 135 checks version information associated with both a source location (e.g., version information 118) and a destination location. For example, processor 10 may provide version information 112 that is expected to match stored version information associated with the source and/or destination locations. Copy engine 135 may determine whether stored version information associated with the source and/or destination locations matches the provided version information 112. In some embodiments, copy engine 135 may determine that an acceptable version information match occurred based on detecting a reserved version number associated with the destination.

Consider a more specific exemplary situation in which memory corruption detection occurs because a pointer is incremented beyond the end of an array during a copy operation. For example, an array with 100 elements may be indexed 0 through 99. This array may have been allocated with associated version information as described above. A block memory operation may request to copy an array element at a position at index 100 (i.e., a location outside of the array). In this situation, copy engine 135 may determine whether stored version information associated with the source location (e.g. source_array[100]) corresponds to expected version information associated with the source array. Similarly, copy engine 135 may determine whether stored version information associated with a destination location (e.g., destination_array[100]) matches expected version information associated with the destination array. In this situation where index 100 is not included in either the source or destination array, copy engine may detect a mismatch between expected version information and stored version information. In some embodiments, copy engine is configured to perform such checks before performing operations associated with a block memory operation. In other embodiments, copy engine 135 is configured to perform such checks for each operation during performance of operations associated with a block memory operation.

Based on comparison of version information, in some embodiments, copy engine 135 is configured not to perform a block memory operation or some portion thereof in response to detecting a mismatch between stored and expected version information. In some embodiments, copy engine 135 is configured to indicate the occurrence of a mismatch to processor 10. Processor 10 may handle such an indication as an exceptional event. Such a configuration may provide efficient memory corruption detection compared to software-based methodologies and hardware-based methodologies that do not offload any memory operations to a copy engine.

In one embodiment, copy engine 135 preserves or overwrites version information associated with such a copy operation based on command 104. For example, when copying the array from entry 106 to a destination location, copy engine 135 may store version information 118 to a location associated with the destination (i.e., overwriting the version information). On the other hand, copy engine 135 may not modify version information associated with the destination (i.e., preserving the version information). Processor 10 may determine whether to preserve or overwrite version information for various reasons.

For example, when an OS moves pages of memory in a way that is not observable by applications (e.g., because the applications use a virtual address to access the pages), it may be desirable to overwrite version information associated with the destination, such that the version information remains the same for an application accessing data on a particular page after the page is moved by the OS. On the other hand, when an application moves chunks of data, it may or may not be desirable to overwrite version information associated with the destination. In general, it may be more common for an application to preserve version information associated with destinations of copy operations. For example, a given buffer used by an application may keep the same version number even when information is moved into or out of the buffer.

Similarly to the above description of a copy operation, copy engine 135 may be configured to check, preserve, and/or overwrite version information based on a command from processor 10 when performing other block memory operations such as clearing, decompressing, compress, setting, etc. Such checking, preserving, and/or overwriting may be performed for an entire block memory operation at a time or separately for different locations associated with the block memory operation.

In some embodiments, copy engine 135 may be configured to perform operations of greater width than may be performed by processor 10. For example, processor 10 may include a load/store unit that is configured to perform load and/or store operations having a maximum number of bits. In these embodiments, copy engine 135 may be configured to perform operations having a number of bits that is greater than the maximum number of bits. For example, a load/store unit may be configured to load a maximum of 256 bits at a time. In this situation, copy engine 135 may be configured to operate on more than 256 bits per operation.

Copy engine 135 may include internal buffers for storing data during a copy operation. In some embodiments, copy engine 135 may perform load and store operations in order to perform a copy. In other embodiments, copy engine 135 may copy data directly from a source location to a destination location without storing the data internally.

General Processor Overview

Figure 1B:
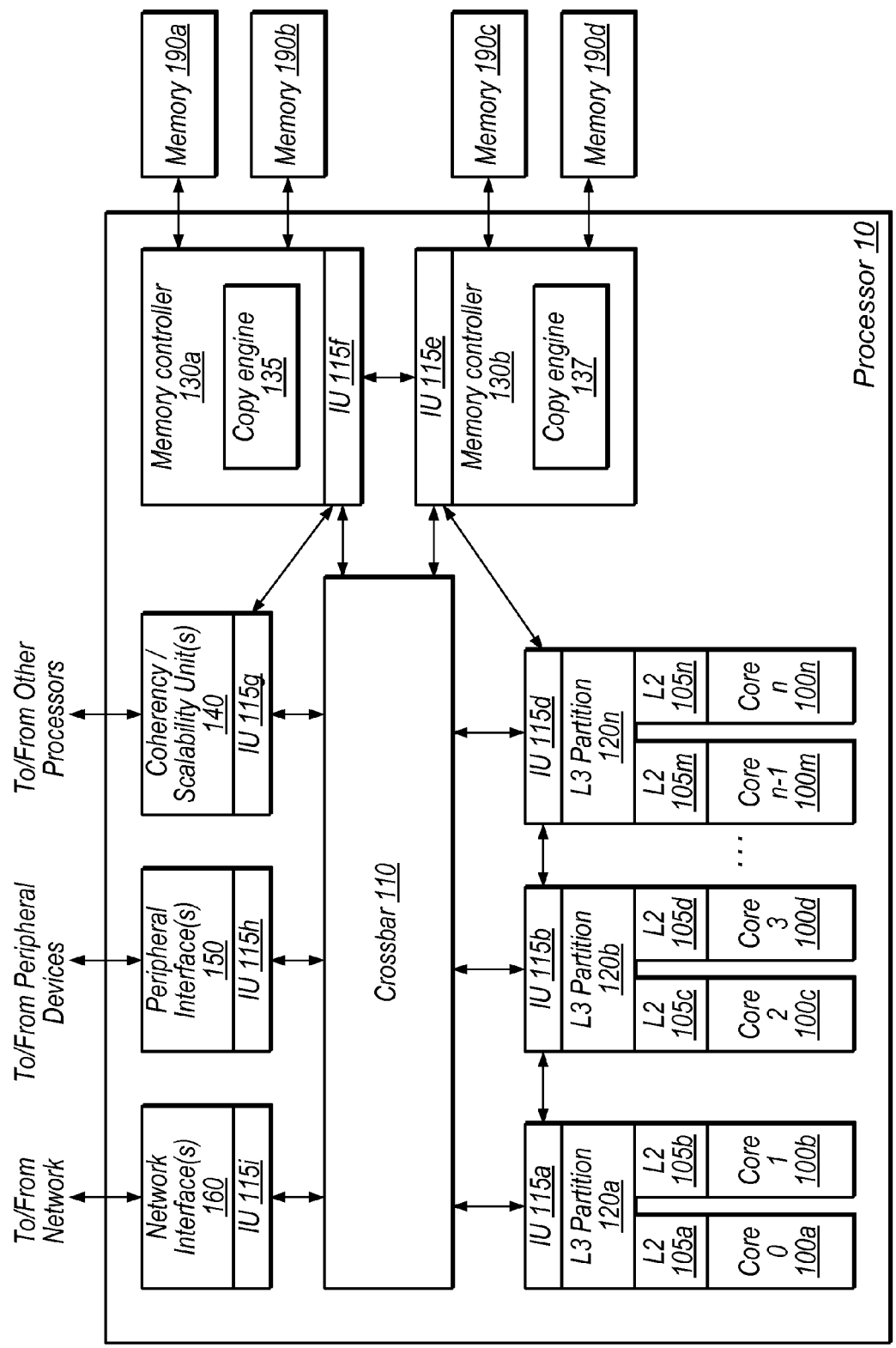
FIG. 1B is a block diagram illustrating one embodiment of a processor that includes a copy engine.

Turning now to FIG. 1B, a block diagram illustrating one exemplary embodiment of processor 10 is shown. In the illustrated embodiment, processor 10 includes a number of processor cores 100a-n, which are also designated "core 0" though "core n." As used herein, the term "processor" may refer to an apparatus having a single processor core or an apparatus that includes two or more processor cores. Various embodiments of processor 10 may include varying numbers of cores 100, such as 8, 16, or any other suitable number. In the illustrated embodiment, each of cores 100 is coupled to a corresponding L2 cache 105a-n, which in turn couple to L3 cache partitions 120a-n via interface units (IU) 115a-d. Cores 100a-n, L2 caches 105a-n, L3 partitions 120a-n, and interface units 115a-i may be generically referred to, either collectively or individually, as core(s) 100, L2 cache(s) 105, L3 partition(s) 120 and IU(s) 115, respectively.

Via IUs 115 and/or crossbar 110, cores 100 may be coupled to a variety of devices that may be located externally to processor 10. In the illustrated embodiment, memory controllers 130a and 130b are configured to couple to memory banks 190a-d. In the illustrated embodiment, memory controller 130a includes copy engine 135, which may be configured to perform operations associated with block memory operations indicated by processor 10. One or more coherency/scalability unit(s) 140 may be configured to couple processor 10 to other processors (e.g., in a multiprocessor environment employing multiple units of processor 10). Additionally, crossbar 110 may be configured to couple cores 100 to one or more peripheral interface(s) 150 and network interface(s) 160. As described in greater detail below, these interfaces may be configured to couple processor 10 to various peripheral devices and networks.

As used herein, the term "coupled to" may indicate one or more connections between elements, and a coupling may include intervening elements. For example, in FIG. 1B, IU 115$f$ may be described as "coupled to" IU 115$b$ through IUs 115$d$ and 155$e$ and/or through crossbar 110. In contrast, in the illustrated embodiment of FIG. 1B, IE 115$f$ 220 is "directly coupled" to IU 115$e$ because there are no intervening elements.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

As shown in FIG. 1B, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread complete in program order. In some embodiments (not shown), each core 100 may include separate L2 data and instruction caches. Further, in some embodiments, each core 100 may include multiple execution pipelines each with associated L1 data and instruction caches. In these embodiments, each core 100 may have multiple dedicated L2 data and/or instruction caches. In the illustrated embodiment, caches are labeled according to an L1, L2, L3 scheme for convenience, but in various embodiments, various cache hierarchies may be implemented having various numbers of levels and various sharing or dedication schemes among processor cores. Copy engine 135 may be configured to interface with caches implemented according to various such methodologies.

Crossbar 110 and IUs 115 may be configured to manage data flow between elements of processor 10. In one embodiment, crossbar 110 includes logic (such as multiplexers or a switch fabric, for example) that allows any L2 cache 105 and/or copy engine 135 to access any partition of L3 cache 120, and that conversely allows data to be returned from any L3 partition 120. That is, crossbar 110 may be configured as an M-to-N crossbar that allows for generalized point-to-point communication. However, in other embodiments, other interconnection schemes may be employed. For example, a mesh, ring, or other suitable topology may be utilized. In the illustrated embodiment, IUs 115$a$-$g$ are also coupled according to a ring topology. Thus, via IUs 115$a$-$g$, any L2 cache 105 and/or copy engine 135 may access any partition of L3 cache 120 via one or more of IUs 115 $a$-$g$. For example, copy engine 135 may access L3 partition 120$b$ via IUs 115$f$, 115$e$, 115$d$, and 115$b$ (as well as via crossbar 110, in the illustrated embodiment). In various embodiments, various interconnections schemes may be employed between various elements of processor 10. The exemplary embodiment of FIG. 1B is intended to illustrate one particular implementation, but other implementations are contemplated.

In some embodiments, crossbar 110 and/or IUs 115 may include logic to queue data requests and/or responses, such that requests and responses may not block other activity while waiting for service. Additionally, in one embodiment, crossbar 110 and/or IUs 115 may be configured to arbitrate conflicts that may occur when multiple elements attempt to access a single L3 partition 120.

L3 cache 120 may be configured to cache instructions and data for use by cores 100. In the illustrated embodiment, L3 cache 120 is organized into multiple separately addressable partitions that may each be independently accessed, such that in the absence of conflicts, each partition may concurrently return data to one or more respective L2 caches 105 and/or copy engines 135. In some embodiments, each individual partition may be implemented using set-associative or direct-mapped techniques. For example, in one embodiment, each L3 partition 120 may be an 8 megabyte (MB), 16-way set associative partition with a 64-byte line size. L3 partitions 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer partitions, or in a scheme that does not employ independently-accessible partitions; it may employ other partition sizes or cache geometries (e.g., different line sizes or degrees of set associativity); it may employ write through instead of write-back behavior; and it may or may not allocate on a write miss. Other variations of L3 cache 120 configuration are possible and contemplated.

In some embodiments, L3 cache 120 implements queues for requests arriving from and results to be sent to crossbar 110 and/or IUs 115. Additionally, L3 cache 120 may implement a fill buffer configured to store fill data arriving from memory controller 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 partitions 120 may variously be implemented as single-ported or multiported (i.e., capable of processing multiple concurrent read and/or write accesses). In either case, L3 cache 120 may implement arbitration logic to prioritize cache access among various cache read and write requestors.

Memory controllers 130$a$-$b$ may be configured to manage the transfer of data between L3 partitions 120 and system memory, for example in response to cache fill requests and data evictions. Memory controller 130 may receive read and write requests and translate them into appropriate command signals to system memory. Memory controller 130 may refresh the system memory periodically in order to avoid loss of data. Memory controller 130 may be configured to read or write from the memory by selecting row and column data addresses of the memory. Memory controller 130 may be configured to transfer data on rising and/or falling edges of a memory clock. In some embodiments, any number of instances of memory interface 130 may be implemented, with each instance configured to control respective one or more banks of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/ DDR2/DDR3/DDR4 SDRAM), or Rambus® DRAM (RDRAM®), for example. In some embodiments, memory interface 130 may be configured to support interfacing to multiple different types of system memory. In the illustrated embodiment, memory controller 130 is included in processor 10. In other embodiments, memory controller 130 may be located elsewhere in a computing system, e.g., included on a circuit board or system-on-a-chip and coupled to processor 10. Copy engine 135 may reside in memory controller 130 as illustrated (or in any location of memory controller 130), or may reside elsewhere in processor 10. In one embodiment, copy engine 135 may reside in a processor core such as core 100c. However, the location of copy engine 135 in memory controller 130a in the illustrated embodiment may allow copy engine 135 more efficient access to memory and L3 cache 120.

Copy engine 135 may be configured as described above with reference to FIG. 1A. Further, in some embodiments, copy engine 135 is coupled to L3 cache 120 in such a way that copy engine 135 is configured to maintain coherency with other processing elements (e.g., L2 caches 105) accessing L3 cache 120. For example, when copy engine modifies data in an L3 cache 120, other processing elements may snoop or monitor the transactions, and/or copy engine 135 may indicate to other processors that the transactions occur. Copy engine 135 may be configured to snoop or monitor cache and/or memory transactions by other copy engines and/or processing cores. In the illustrated embodiment, such communication may utilize IUs 115 and/or crossbar 110 according to various cache coherency implementations. For example, processor 10 may implement protocols such as MESI, MOSI, MOESI, etc. to maintain coherency between various caches.

In one embodiment, copy engine 135 is configured to operate on data in a cache, a memory, or both. Copy engine 135 may operate on data in one or both of a cache and memory based on a command such as command 104 discussed above with reference to FIG. 1A. For example, core 100c may send a command to copy engine 135 that indicates to copy engine 135 to operate on data in memory 190b. Based on such a command, copy engine 135 may invalidate entries in a cache (e.g., L3 cache 120) that are associated with the modified data. Alternately, core 100c may send a different command that indicates to copy engine 135 to operate on data in a cache (e.g., L3 partition 120b). In this situation, copy engine 135 may store version information to be stored with the data in the cache and indicate that the data in the cache is modified or "dirty" (e.g., so that it will eventually be written back to memory). Also, a command may indicate to modify data both in a memory and a cache. In various embodiments, copy engine 135 is configured to maintain coherency among caches and memory while performing operations based on commands. Speaking generally, copy engine 135 may appropriately check and/or modify cache tags while performing various memory operations.

In one embodiment, copy engine 135 accesses a cache and/or a memory using physical addresses. In some embodiments, copy engine 135 receives address information in a command as physical addresses. For example, a core 100 may translate virtual addresses to physical addresses before sending a command to copy engine 135. In embodiments were version information is encoded in a virtual address (as will be described below with reference to FIG. 5), the core 100 may also send version information separately from the address information.

In other embodiments, copy engine 135 receives address information in a command as virtual addresses. In these embodiments, copy engine 135 is configured to translate virtual addresses to physical addresses. In one embodiment, copy engine 135 does not include a translation lookaside buffer (TLB), and is not configured to handle exceptional events such as page faults that occur in the context of translation of virtual addresses to physical addresses. Thus, a hypervisor or other privileged software may handle such exceptional events for copy engine 135, e.g., by executing a trap routine using a core 100. In embodiments in which copy engine 135 receives virtual addresses, version information may be encoded in unused bits of the virtual addresses as will be described below with reference to FIG. 5.

Processor 10 may be configured for use in a multiprocessor environment with other instances of processor 10 or other compatible processors. In the illustrated embodiment, coherency/scalability unit (s) 140 may be configured to implement high-bandwidth, direct chip-to-chip communication between different processors in a manner that preserves memory coherence among the various processors (e.g., according to a coherence protocol that governs memory transactions). In this embodiment, operations performed by copy engine 135 may be included in such a coherence protocol.

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI-Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of a Processor Core

Figure 2:
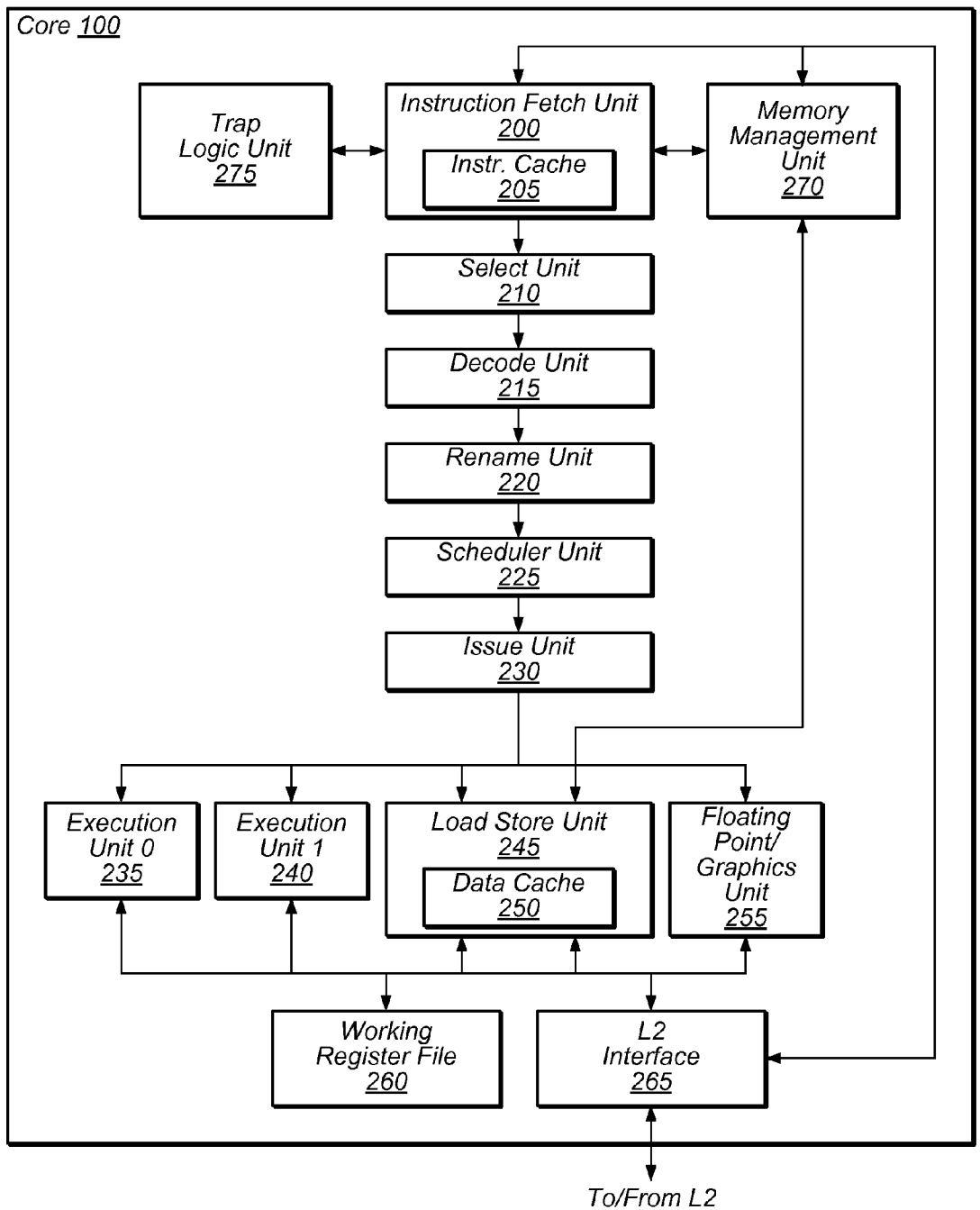
FIG. 2 is a block diagram illustrating one embodiment of a processor core.

Turning now to FIG. 2, one exemplary embodiment of core 100 is shown. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a scheduler unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing. In one embodiment, during each execution cycle of core 100, IFU 200 may be configured to select one thread that will enter the IFU processing pipeline. Thread selection may take into account a variety of factors and conditions, some thread-specific and others IFU-specific. Any suitable scheme for thread selection may be employed.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

In one embodiment, during any given execution cycle of core 100, select unit 210 may be configured to select one or more instructions from a selected threads for decoding by decode unit 215. In various embodiments, differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, scheduler unit 225 may be configured to pick (i.e., schedule/dispatch) instructions that are ready for execution and send the picked instructions to issue unit 230. In one embodiment, scheduler unit 225 may be configured to maintain a schedule queue that stores a number of decoded and renamed instructions as well as information about the relative age and status of the stored instructions. During each execution cycle, this embodiment of scheduler unit 225 may pick up to one instruction per slot. For example, taking instruction dependency and age information into account, for a given slot, scheduler unit 225 may be configured to pick the oldest instruction for the given slot that is ready to execute.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

In some embodiments, processor 10 may send commands to copy engine 135 rather than performing memory operations using LSU 245. Offloading processing of memory operations in this manner may free resources in core 100 for other processing.

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS) architecture, such as VIS 2.0 or VIS 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. Additionally, in the absence of exceptional events, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In one embodiment, a TLU 275 within a core of processor 10 may be configured to receive notification of an exceptional event occurring during execution of a particular thread, such as the mismatch found during version information comparison performed by copy engine 135. Copy engine 135 may store information identifying a particular operation or set of operations that resulted in such a mismatch. The identifying information may be used for later debugging processes. The TLU may cause execution control of a trapped thread to vector to a supervisor-mode software handler (i.e., a trap handler) corresponding to the detected event. In one embodiment, the TLU may be configured to flush all instructions from the trapping thread from any stage of processing within an associated core within the processor 10 without disrupting the execution of other, non-trapping threads.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations. In some embodiments, a core 100 includes multiple instruction execution pipelines.

Figure 3:
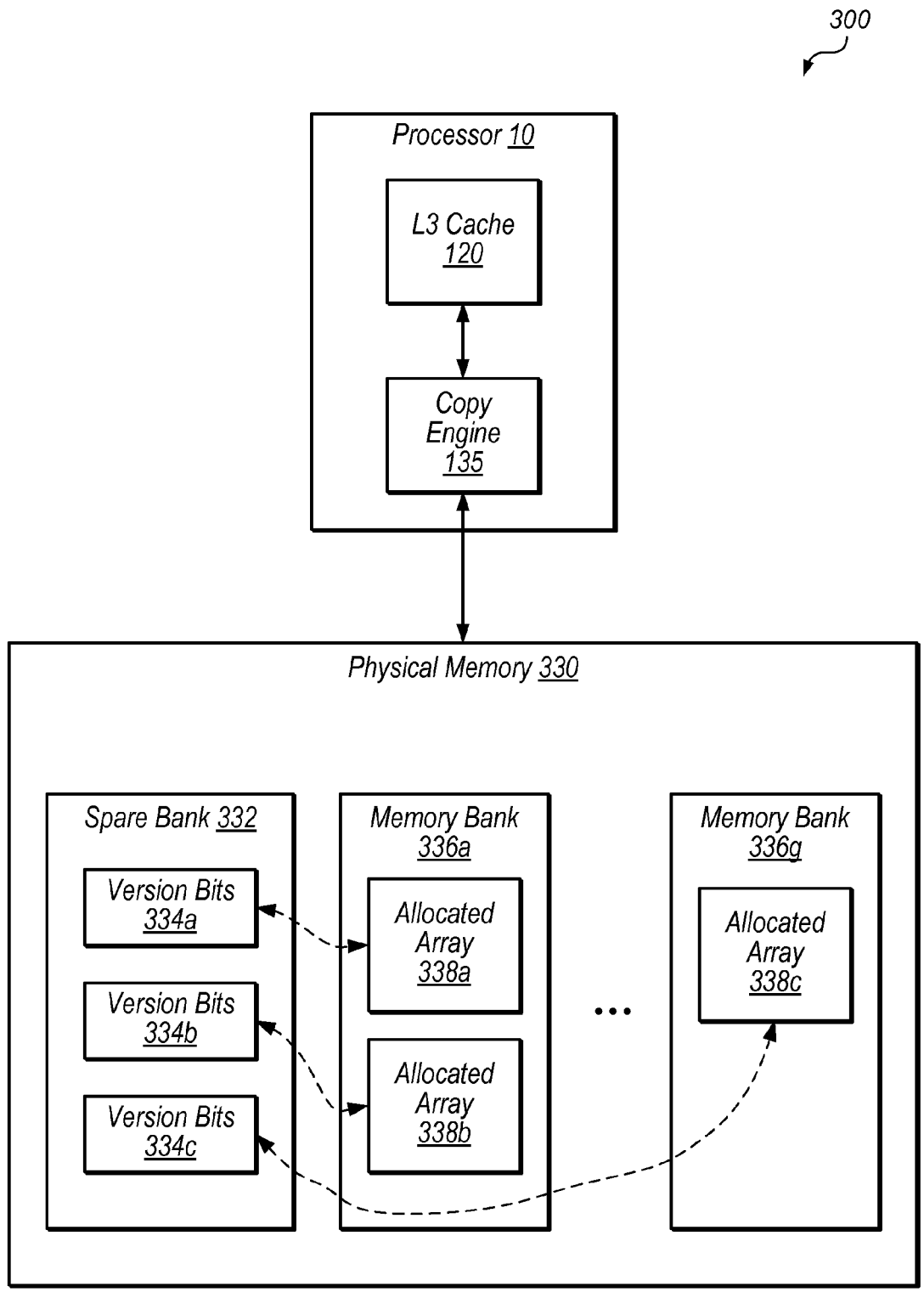
FIG. 3 is a block diagram illustrating one embodiment of a processor and a physical memory that includes spare banks.

Turning now to FIG. 3, a generalized block diagram illustrating one embodiment of a computing system 300 is shown. In the illustrated embodiment, physical memory 330 is arranged so as to facilitate handling of version information by copy engine 135.

System 300 includes processor 10 and physical memory 330. Processor 10 includes copy engine 135 and L3 cache 120 (which may be a single cache or a partitioned cache as shown in the embodiment of FIG. 1B). Physical memory 330 may be coupled to lower levels of a memory hierarchy, such as a disk memory and offline archive memory. These lower levels of memory are not shown for ease of illustration. Although only one processor 10 is shown, it is possible and contemplated system 100 may include multiple processors and multiple associated caches. In one embodiment, physical memory 330 comprises dynamic random access memory (DRAM).

Spare-bank memory and memory mirroring are advanced mechanisms that enable systems to handle memory errors, such as multi-bit errors. In one embodiment, the physical memory 330 comprises a spare-bank DRAM. The spare-bank memory feature may be implemented in memory controller 130 and the system basic input/output system (BIOS) software. This feature may enable administrators to configure a spare row, or bank, of memory for spare use. It is noted that while the present discussion describes the use of spare memory banks for the storage of version information, the methods and mechanisms described herein are applicable using alternative non-spare bank storage. For example, version information may simply be stored in alternative locations within memory. For example, version information corresponding to an address N may be stored at a given displacement such as N+10000. Alternatively, the version information may be stored at a location which is based on another computation related to an access address. In some embodiments, dedicated shadow memory may be utilized to store version information. In various embodiments, version information is stored in such a manner that only a single memory access is required to obtain both the requested data and corresponding version information. For example, the version information may be stored in close proximity to the requested data so that both are obtained in a single access. Numerous such alternatives are possible and are contemplated. A command sent to copy engine 135 may indicate the location of version information associated with a memory operation.

The physical memory 330 may store one or more software applications (not shown) that are later compiled and loaded into the cache memory subsystem. Generally speaking, for a given software application, the kernel of an operating system sets up an address space for the application, loads the application's code into the physical memory 330, sets up a stack for the application, branches to a given location inside the application, and begins execution of the application. Dynamic objects accessed with pointers may be allocated during program execution. As shown, one or more arrays 338a-338c of bytes may be allocated during the execution of one or more software applications. While arrays are used herein as one example of a data structure, the methods and mechanisms described are applicable to other types of data structures as well.

In one embodiment, each of the allocated arrays 338a-338c has associated version bits of the version bits 334a-334c stored in the spare bank 332. The spare bank 332 may be borrowed for the purpose of storing the version bits to be used for memory corruption detection. An access to a memory location within one of the allocated arrays 338a-338c by a read or a write operation may cause the data stored in that memory location to be returned to processor 10 and/or copy engine 135. The associated version bits for the accessed memory location may be returned to the processor along with the data. For example, if a memory location within the allocated array 338a is accessed, then the version bits 334a may be returned to the processor 10 and/or copy engine 135 along with the accessed data within the allocated array 338a.

Each memory access may utilize both an address and a version number indicated by the version bits. In one embodiment, when data is written to memory, the hardware in the processor 10, memory controller 130, and/or copy engine 135 may verify the version bits from the store operation match the associated version bits recorded in the spare bank 332. When data is loaded, a similar process may occur. An error may be flagged when a mismatch is found. As discussed above with reference to FIG. 1A, copy engine 135 may verify and/or modify version information for various memory operations.

In one embodiment, the physical memory 330 or memory controller 120 may return a value of zero to the copy engine 135 for any associated version number for a memory access. The value of zero may indicate a "not set" state for the version number. In this case copy engine 135 may not compare the version bits provided by the application against those provided by hardware. In one embodiment, the application may continue running although the memory location was not one that was supposed to be accessible through the pointer used by the software.

Figure 4:
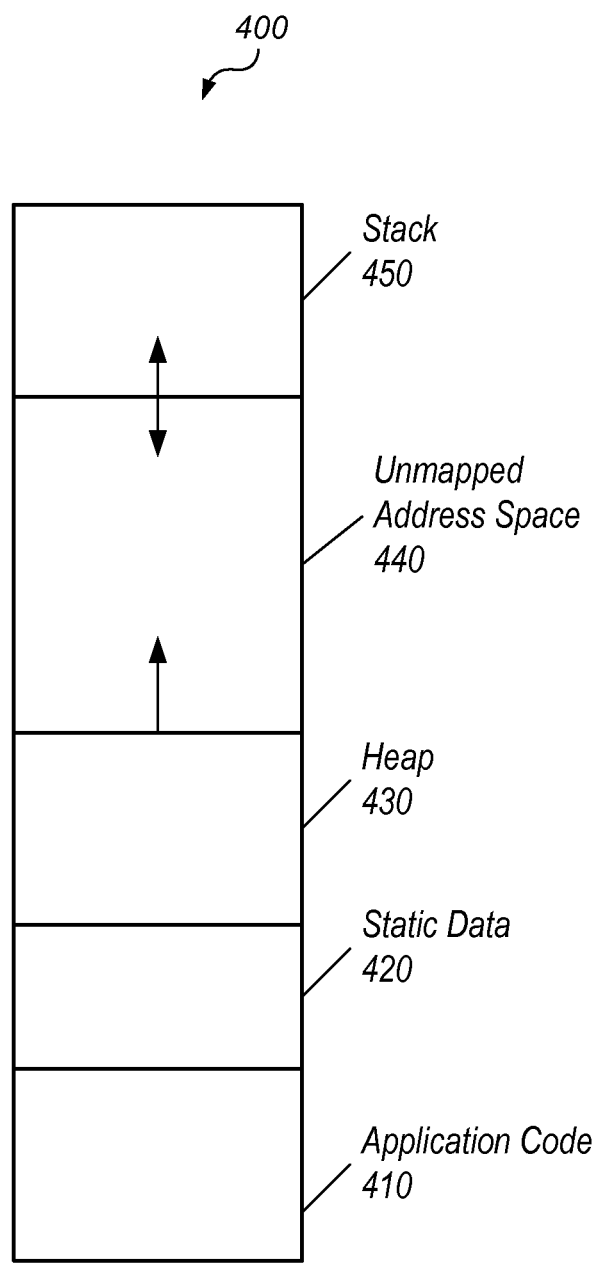
FIG. 4 is a generalized block diagram illustrating one embodiment of a process address space.

Referring now to FIG. 4, a generalized block diagram illustrating one embodiment of a process address space 400 is shown. The address space for a given process may be a contiguous virtual address space, wherein a mapping between virtual addresses and physical addresses determines the location of data values and application code in physical memory 330. The interaction of compilers and high-level languages affects how a software application uses an instruction set architecture (ISA). In some embodiments, high-level application languages may be compiled into different instructions of an instruction set architecture in order to utilize of a copy engine as described herein, e.g., by sending a command to a copy engine instead of performing memory operations using conventional load/store instructions. Software application development uses a number of variables to be allocated and addressed and a number of registers used to allocate variables. In one embodiment, the static data 420, the stack 450, and the heap 430 determine data allocation for the application code 410.

The static data 420 may be used to allocate statically declared objects, such as global variables and constants. A majority of these objects may be arrays. The stack 450 may be used to allocate scalar variables rather than arrays, such as local variables and parameters in the functions currently being invoked. The stack 450 may be grown and shrunk on procedure call or return, respectively. The heap 430 may be used to allocate dynamic objects accessed with pointers and are typically not scalar variables. The heap 430 may be used to reduce the frequency of copying the contents of strings and lists by storing the contents of temporary strings or lists during the string/list operations. The heap is not affected by the return of the function call.

Figure 5:
FIG. 5 is a generalized block diagram illustrating one embodiment of memory access address formats.
Figure 5:
Figure 5:
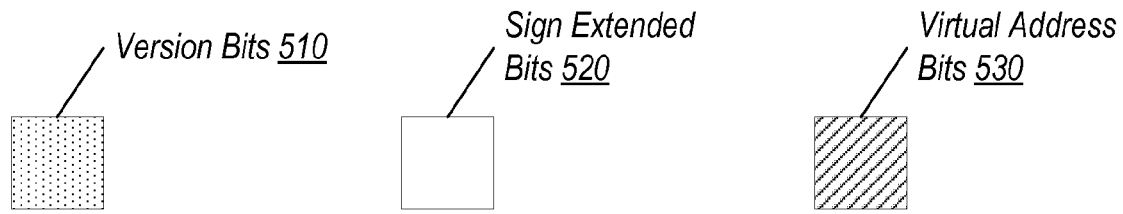

Turning now to FIG. 5, a generalized block diagram illustrating one embodiment of memory access address formats is shown. Modern computing systems use virtual memory in order to share a smaller amount of physical memory among many processes. An address space may be a contiguous virtual address space, wherein a mapping between virtual addresses and physical addresses determines the location of stored data in physical memory.

When software allocates a region of memory, such as with a calloc or a malloc C++ subroutine used for dynamic memory allocation, a version number may be assigned to the allocated array. The subroutine and/or a heap manager may utilize a modified block initialization store instruction within an iterative loop to zero out the allocated array. In one embodiment, copy engine 135 may zero out the allocated array based on a command issued by a processor core for the subroutine. Copy engine 135 may operate on a cache line basis. For example, 128 store operations may be used to allocate an 8-kilobyte (KB) array, wherein each cache line is 64 bytes. In other embodiments, copy engine 135 may operate on multiple cache lines at once. In addition, copy engine 135 may cause an associated version number to be stored in an associated location such as in spare bank 332 shown in FIG. 3.

In one embodiment, the OS is made aware of extra metadata being used for memory access operations through a state bit, such as a memory corruption detection (mcd) state bit. In one embodiment, when the mcd state bit is deasserted, the most-significant bit (MSb) of the virtual address bits 530 is sign extended to provide the sign-extended bits 520. In one embodiment, if the bits 520 do not equal a sign-extended value of the MSb of the virtual address bits 530, an exception may occur.

In one embodiment, when the mcd state bit is asserted, the MSb of the virtual address bits 530 is sign-extended for a smaller portion of the total address. The sign-extended value 520 is smaller in this case. In one embodiment, the upper bits of the memory access address store an associated version number 510 to be used for later comparisons. In one embodiment, the memory access address is a 64-bit value. The virtual address 530 comprises bits 53 to 0. When the mcd state bit is asserted, the sign-extended value 520 comprises bits 59 to 54 and the version number 510 comprises bits 63 to 60. Although the bits in the memory access addresses are shown in this particular order, other combinations are possible and other or additional bits may be utilized as well. The bits storing information for the portions 510-530 may or may not be contiguous. Similarly, the arrangement of the portions 510-530 may use other placements for better design trade-offs.

Turning now to FIG. 6, a generalized block diagram illustrating one embodiment of a truth table for a version number mismatch is shown. In one embodiment, the possible values for a version number that may be used are in either an available set or a reserved set. The version numbers in a reserved set may indicate either memory is not utilizing version numbers or memory is unable to utilize version numbers. For example, when a hardware failure occurs in the DRAM and a failover mechanism begins to use the spare bank 332, the stored version numbers may not be used anymore. In another example, an uncorrectable error has occurred and the memory does not return valid data.

In one embodiment, one value for the reserved set may be sufficient to handle the conditions described above. However, another version number value may be used in the reserved set to ease software adoption of the mcd state. For example, as shown in FIG. 4, the heap 430 may occupy a lower half of a virtual address space. In such a case, the most-significant bits of an associated virtual address may comprise binary 0's. The stack 450 and shared libraries may occupy an upper half of the virtual address space. The most-significant bits of an associated virtual address may comprise binary 1's. A single version number value in the reserved set may make it difficult for software, such as the OS, to determine if pointers to the upper half of the virtual address space have associated version numbers in the available set. For example, for a 4-bit version number 0xF, wherein 0x denotes a hexadecimal value, this value may indicate either an associated memory access address corresponds to a memory location with a version number equal to 0xF or the memory access address corresponds to a memory location that is not assigned a version number. To simplify logic, both a 0x0 value and a 0xF value may be placed in the reserved set. For the 4-bit version number example, the other values between 0x0 and 0xF may be placed in the available set. Various numbers of version bits are contemplated and any appropriate number of version bits may be used to encode version information.

The software may use the version number values in the available set for assigning version numbers to allocated arrays 338a-338c. The values "A" and "B" represent two different members of the available set, but the values A and B do not equal one another. In one example, when a version number comprises 4 bits, a reserved set may include the 2 values 0x0 and 0xF, and an available set may include the 14 values 0x1 to 0xE.

As shown in the truth table, a version mismatch may occur when a version number in a memory access address corresponding to a load or a store operation from the processor 10 is in the available set, but it does not match the version number stored in the spare bank 332 associated with the memory location identified by the memory access address. In addition, the version number stored in the spare bank 332 is in the available set for a mismatch to occur. When a version number stored in the spare bank 332 is within the reserved set, a mismatch does not occur as shown in the table. When a version number in a memory access address corresponding to a load or a store operation from the processor 302 is in the reserved set, an unexpected condition has occurred. Accordingly, this unexpected occurrence causes a mismatch to be detected.

Figure 7:
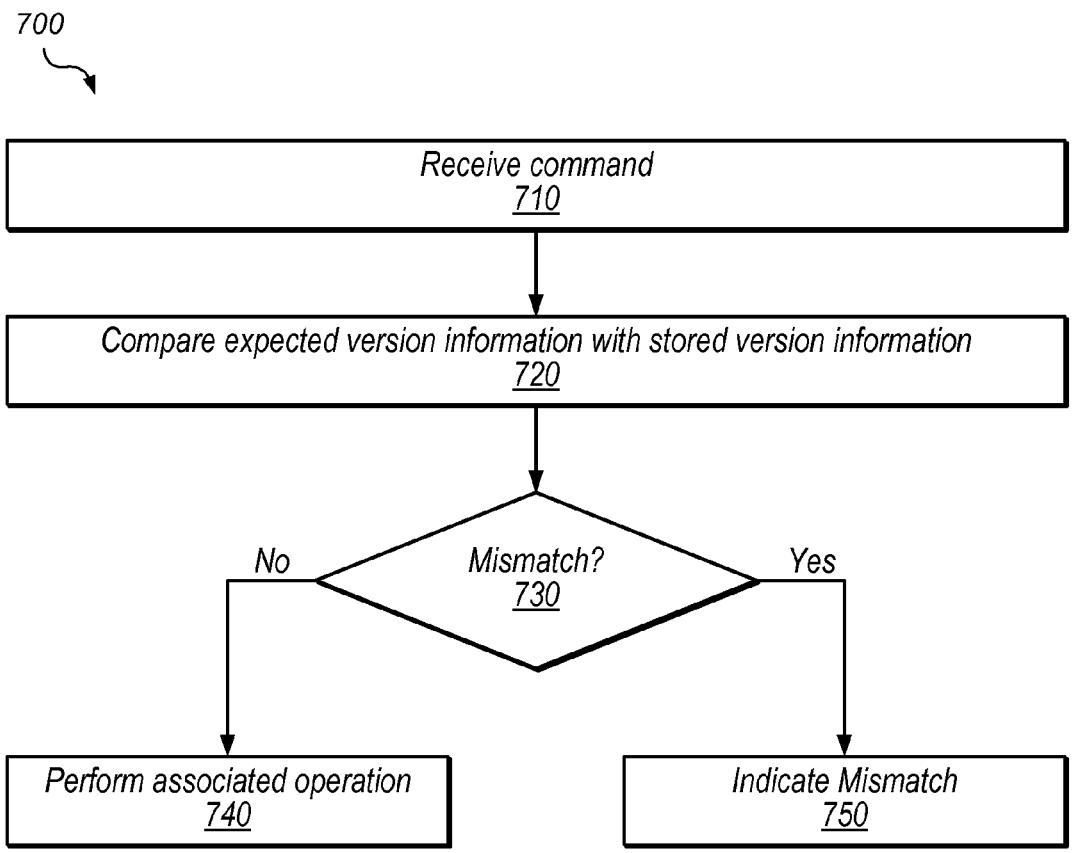
FIG. 7 is a flow diagram illustrating one embodiment of a method for handling version information.

Referring now to FIG. 7, a flow diagram illustrating one embodiment of a method 700 for handing version information is shown. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, a command is received. In one embodiment, the command is sent to copy engine 135 based on a block memory operation. The command may indicate one or more memory operations to be performed by copy engine 135. The command may include address information, version information and/or other parameters. The command may indicate whether to perform memory operations using a cache, a memory, or both. The command may indicate whether to preserve or overwrite version information. Flow proceeds to block 720.

At block 720, expected version information is compared with stored version information. Copy engine 135 may compare expected version information included in the command received in block 710 to stored version information in a cache or memory. Copy engine 135 may perform multiple such comparisons for multiple operations indicated by the command. For example, copy engine 135 may check version information for multiple entries in a data structure. In one embodiment, copy engine 135 checks version information for each cache line of data involved in a memory operation. Flow proceeds to decision block 730.

At decision block 730, it is determined whether a mismatch occurred between expected version information and stored version information. In one embodiment, copy engine 135 determines whether a mismatch occurred as described above with reference to FIG. 6. If the result of decision block 730 is "yes," i.e., a mismatch is detected, flow proceeds to block 750. Otherwise, flow proceeds to block 740.

At block 740 an operation associated with the command is performed. The operation may be a copy, compress, decompress, move, allocate, or clear operation, for example. Copy engine 135 may indicate successful completion of the operation. Flow ends at block 740.

At block 750, a mismatch is indicated. Copy engine 135 may indicate the mismatch to a processor core or a processing element thereof, such as TLU 275. Copy engine 135 may or may not perform a memory operation associated with the mismatch after detecting the mismatch. Based on the indication, a trap handler may be executed by processor 10. Flow ends at block 750.

Figure 8:
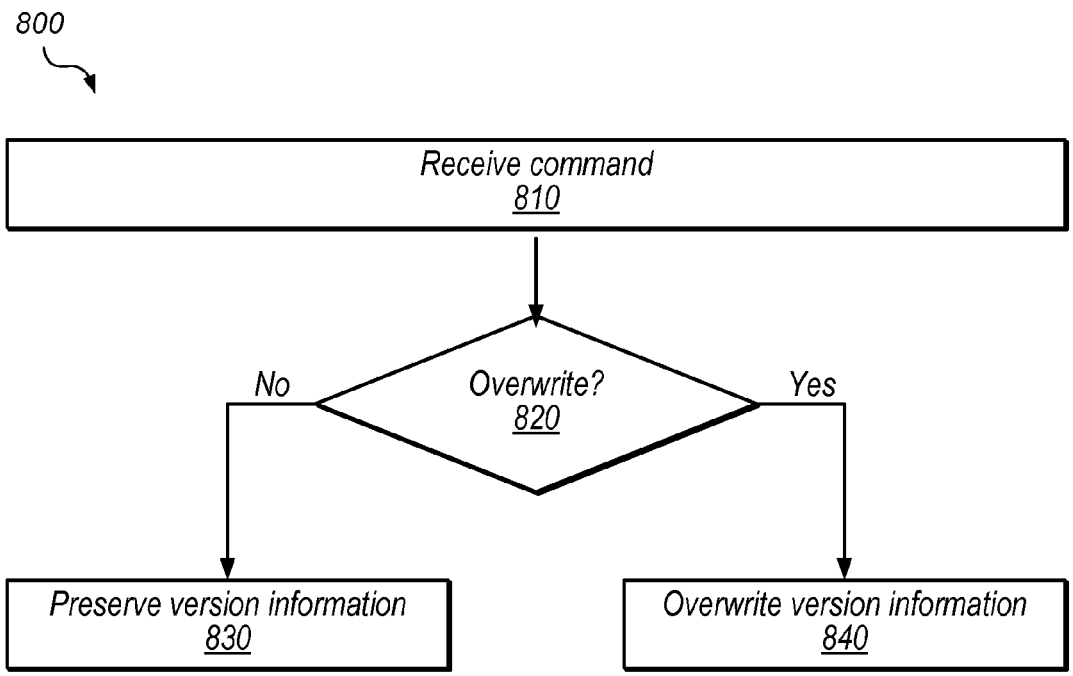
FIG. 8 is a flow diagram illustrating one embodiment of a method for handling version information.

Referring now to FIG. 8, a flow diagram illustrating one embodiment of a method 800 for handing version information is shown. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 810.

At block 810 a command is received. In one embodiment, the command is sent to copy engine 135 based on a block memory operation. The command may indicate one or more memory operations to be performed by copy engine 135. The command may include address information, version information and/or other parameters. The command may indicate whether to perform memory operations using a cache, a memory, or both. The command may indicate whether to preserve or overwrite version information. Flow proceeds to decision block 820.

At decision block 820, it is determined whether the command indicates to overwrite version information. Processor 10 and/or a core 100 may determine whether to overwrite version information based on characteristics of an application or OS requesting the block memory operation or the type of operation to be performed and indicate the determination to copy engine 135 using the command. In one embodiment, copy engine 135 may determine whether to preserve or overwrite version information as part of the performing an associated operation of block 740 described above with reference to FIG. 7. In other words, once copy engine 135 has checked version information, copy engine 135 may determine whether to preserve or overwrite version information based on the command. If the result of decision block 820 is "yes," flow proceeds to block 840. Otherwise, flow proceeds to block 830.

At block 830 version information is preserved. Copy engine 135 may preserve version information by writing to a memory location associated with the version information but not overwriting the version information. This may be desirable when an application moves data to a buffer, for example, so that the buffer can maintain a consistent version number. Flow ends at block 830.

At block 840, version information is overwritten. Copy engine 135 may overwrite stored version information with new version information when writing to a location associated with the stored version information. This may be desirable when an OS requests a block memory operation, for example. Flow ends at block 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   issuing by a processing element, one or more program instructions that specify a block memory operation that includes a write operation to a destination location, wherein version information is associated with the block memory operation;
   sending by the processing element, a command to a coprocessing element based on the block memory operation; and
   performing, by the coprocessing element, one or more operations associated with the block memory operation in response to the command, wherein the performing includes:
     accessing stored version information associated with the destination location of the write operation;
     comparing expected version information included in the command with the accessed version information; and
     indicating a result of the comparing to the processing element.

2. The method of claim 1,
   wherein the processing element includes a load/store unit configured to perform load/store operations having a maximum number of bits; and
   wherein the one or more operations performed by the coprocessing element have a number of bits that is greater than the maximum number of bits.

3. The method of claim 1, wherein the expected version information is included in the command.

4. The method of claim 1, further comprising:
   indicating to the processing element that the version information associated with the destination and the expected version information do not match.

5. The method of claim 1,
   wherein the block memory operation is a copy operation, the method further comprising:
     comparing expected version information with stored version information associated with a source of the copy operation; and
     indicating to the processing element that the version information associated with the source and the expected version information do not match.

6. The method of claim 1, further comprising overwriting version information associated with the block memory operation.

7. The method of claim 1, further comprising preserving version information associated with the block memory operation.

8. An apparatus, comprising:
   a processor configured to generate a command for a block memory operation that includes a write operation to a destination location; and
   a copy engine configured to receive the command from the processor and perform one or more operations associated with the block memory operation in response to the command, wherein the one or more operations include:
     accessing stored version information associated with the destination location of the write operation;
     comparing expected version information specified by the command with the accessed version information; and
     indicating a result of the comparing to the processor.

9. The apparatus of claim 8, wherein the copy engine is configured to:
   preserve stored version information associated with the block memory operation in response to an indication in the command that the stored version information should be preserved; and
   overwrite stored version information associated with the block memory operation in response to an indication in the command that the stored version information should be overwritten.

10. The apparatus of claim 8, wherein the copy engine is configured to perform the one or more operations by operating on data in a cache.

11. The apparatus of claim 10, wherein the copy engine is configured to maintain coherency with one or more other processing elements configured to access the cache.

12. The apparatus of claim 8,
    wherein the one or more operations include modifying entries in a memory; and
    wherein the copy engine is configured to invalidate one or more cache lines associated with the modified entries of the memory based on the command.

13. The apparatus of claim 12,
    wherein the one or more operations include modifying entries in a memory; and
    wherein the copy engine is configured to update one or more cache lines with the modified entries of the memory based on the command.

14. A non-transitory, computer-readable storage medium having instructions stored thereon that are executable by a computing device to perform operations comprising:
    issuing, by a processing element, a command to a copy engine, wherein the command is associated with a block memory operation, wherein the command specifies expected version information for a write operation included in the block memory operation; and
    receiving, by the processing element, a result from the copy engine, wherein the result is of a comparison of the expected version information and stored version information associated with a destination location of the write operation;

wherein the command indicates whether to preserve or overwrite the stored version information.

15. The storage medium of claim 14, wherein the command includes a pointer to a block of command parameters.

16. The storage medium of claim 14, wherein issuing the command includes writing to one or more registers of the copy engine.

17. The storage medium of claim 14, wherein the command includes one or more program instructions.

18. The storage medium of claim 14, wherein the command includes the expected version information.

19. The storage medium of claim 18, wherein the operations further comprise:
   receiving an indication from the copy engine that the expected version information does not match the stored version information; and
   initiating a corrective action based on the indication.

* * * * *

UNITED STATES PATENT AND TRADEMARK OFFICE
CERTIFICATE OF CORRECTION

| | | |
|---|---|---|
| PATENT NO. | : 9,043,559 B2 | Page 1 of 1 |
| APPLICATION NO. | : 13/658789 | |
| DATED | : May 26, 2015 | |
| INVENTOR(S) | : Radovic et al. | |

It is certified that error appears in the above-identified patent and that said Letters Patent is hereby corrected as shown below:

In the specification

Column 16, line 21, delete "checking" and insert -- checking. --, therefor.

Column 16, line 26, delete "checking" and insert -- checking. --, therefor.

Signed and Sealed this
Ninth Day of February, 2016

Michelle K. Lee
*Director of the United States Patent and Trademark Office*